(12) United States Patent
Jilkén

(10) Patent No.: US 10,386,094 B2
(45) Date of Patent: Aug. 20, 2019

(54) COMPOSITE SOLAR COLLECTOR

(71) Applicant: Leif Jilkén, Kalmar (SE)

(72) Inventor: Leif Jilkén, Kalmar (SE)

( * ) Notice: Subject to any disclaimer, the term of this patent is extended or adjusted under 35 U.S.C. 154(b) by 0 days.

(21) Appl. No.: 15/353,759

(22) Filed: Nov. 17, 2016

(65) Prior Publication Data

US 2018/0135889 A1    May 17, 2018

(51) Int. Cl.
| | |
|---|---|
| *F24J 2/46* | (2006.01) |
| *F24S 20/62* | (2018.01) |
| *F24S 20/67* | (2018.01) |
| *F24S 10/70* | (2018.01) |
| *F24S 70/14* | (2018.01) |
| *F24S 70/30* | (2018.01) |
| *F24S 80/00* | (2018.01) |

(52) U.S. Cl.
CPC ............ *F24S 20/62* (2018.05); *F24S 10/72* (2018.05); *F24S 10/73* (2018.05); *F24S 20/67* (2018.05); *F24S 70/14* (2018.05); *F24S 70/30* (2018.05); *F24S 2010/71* (2018.05); *F24S 2080/03* (2018.05); *Y02B 10/20* (2013.01); *Y02E 10/44* (2013.01)

(58) Field of Classification Search
USPC ........................................................ 126/569
See application file for complete search history.

(56) References Cited

U.S. PATENT DOCUMENTS

| | | | | |
|---|---|---|---|---|
| 4,474,168 A * | 10/1984 | Pettit | ................... | E04H 4/0018 126/563 |
| 5,561,958 A | 10/1996 | Clement et al. | | |
| 9,068,756 B1 * | 6/2015 | Murray | ................. | F24D 11/003 |
| 2002/0018907 A1 | 2/2002 | Zehner | | |
| 2004/0111998 A1 * | 6/2004 | Moore | ...................... | E04C 2/28 52/586.1 |
| 2008/0008698 A1 | 1/2008 | Bartels et al. | | |
| 2008/0047547 A1 * | 2/2008 | Jona | ......................... | F24J 2/202 126/705 |
| 2009/0229598 A1 | 9/2009 | Cao et al. | | |
| 2012/0219723 A1 | 8/2012 | Jilken | | |
| 2012/0313278 A1 | 12/2012 | Nishion et al. | | |
| 2013/0133858 A1 | 5/2013 | Friman | | |
| 2013/0276390 A1 | 10/2013 | Krecke | | |

FOREIGN PATENT DOCUMENTS

| | | |
|---|---|---|
| AU | 2013201559 A1 | 4/2013 |
| DE | 102011109680 A1 | 2/2013 |
| EP | 0041724 A1 | 6/1981 |
| EP | 2578379 A1 | 4/2013 |
| JP | 2013197252 A | 9/2013 |
| JP | 2014163647 A | 9/2014 |
| SE | 0701395 L | 1/2009 |
| SE | 0800177 L | 7/2009 |
| SE | 532498 C2 | 2/2010 |
| WO | 2008153469 A1 | 12/2008 |
| WO | 2010139772 A2 | 12/2010 |

\* cited by examiner

*Primary Examiner* — Avinash A Savani
(74) *Attorney, Agent, or Firm* — Gabriela Tomescu, Esq.; Bergenstråhle & Partners AB

(57) ABSTRACT

A solar collector adapted to absorb thermal heating from the sun, wherein said solar collector comprises hollow sections adapted to house a medium. The solar collector is a self-supporting composite solar collector produced from a composite material constituted of at least a first and second material, wherein said first and second materials have equal or substantially equal coefficients of elasticity.

14 Claims, 13 Drawing Sheets

COMPOSITE SOLAR COLLECTOR

This application is the continuation of International Application No. PCT/SE2015/050963, filed 14 Sep. 2015, which claims the benefit of Swedish Patent Application Nos. SE 1451081-2, filed 16 Sep. 2014, and SE 1451248-7, filed 17 Oct. 2014, the entire contents of which are hereby incorporated by reference.

TECHNICAL FIELD

The present invention relates generally to a composite solar collector for heating of an internal medium, preferably water.

BACKGROUND ART

In prior art it is known to collect sunlight through absorption surfaces, such as solar collectors heating water, air, or any other form of medium. The medium is in general adapted to either be used, as warm water in a domestic application or as a heat transfer medium used to heat an indoor area, heated floor, or any other form of application area requiring heating. Solar collectors are further common for heating of water used for swimming pools both in public and private settings.

Solar collectors heating different sorts of mediums has been available on the market for a long time and the most common solution currently sold in the world are glazed solar collectors where the collectors utilize glass tubes to absorb heat. The market is dominated by two different techniques that both present options both for domestic and public use. Those two solutions are evacuated tube collectors and flat plate collectors, both glazed options.

In addition to the glazed solar collectors a segment of unglazed solar collectors are available as an in general cheaper alternative. Those solar collectors are almost exclusively sold on the North American, Brazilian, and Australian markets for the use of heating water in swimming pools. Due to the limited efficiency of such solutions are they overrepresented for private swimming pools installed by home owners. Even though those solar collectors are unglazed are their structural components fragile and easily broken. Those skilled in the art are aware of the vast problems with repairing and replacing such solutions.

There are multiple reasons for why the fragile solutions dominate the market of unglazed solar collectors, mostly corresponding to heat transfer rates and cost. In order for traditional unglazed solar collectors to gain a transfer rate between absorption surfaces of the solar collector and the medium inside considered sufficient those structures are normally produced with very thin material thickness. One trivial example that has been regularly available on the market is a black plastic bag that is filled with water and placed in the sun allowing the water to be heated. Those have in prior art for example been used to produce warm water for portable showers adapted for camping and boat vacations.

As described there are numerous of drawbacks with the existing technology of unglazed solar collectors, such as the fragileness, relatively bad efficiency, and an often unpleasant esthetical appearance. Similar problems of fragileness and unpleasant esthetical appearance also applies for most glazed solar collectors on the market and in addition are those solution normally more expensive resulting in a long investment term before the value created by the solar collectors corresponds to the invested value.

Furthermore, the aforementioned solutions, of both glazed and unglazed collectors, are in many cases adapted to be arranged for example on roofs or any similar structure, preferably where they are as inaccessible as possible in order to decrease the risk of damage. This is due to the fragile nature as previously described and because roofs and similar surfaces often provide a clear line between the sunrays and the solar collector for large portions of the day. Arranging solar collectors on roofs and similar areas that are in plain sight further increases the problems associated with such solutions. Architects and city planners are reluctant to install installations that are not part of the esthetical appearance of a building or construction. This causes problems with for example building permits which in many jurisdictions are required for visible solar collectors.

In prior art it is further known that heat transfer between the solar collector and the medium inside is essential for the efficacy of the solar collector. It is further known that the ambient temperature is affecting the efficiency and that the heat leakage between the ambient air and the medium shall be minimized in order to increase the efficacy. However, in general there is a relation between decreasing the leakage of heat with the transfer rate making thin structures the most suitable solution.

The person skilled in the art understands that glazed solar collectors are fragile constructions that need to be handled with care during installation and installed in a way that they are hard to access and thereby damage. However, the requirement for efficacy demands that the materials in the solar collectors are thin in order to utilize sufficient heat transfer between the absorption surface and the medium which has the effect that also the unglazed solar collectors become fragile.

SUMMARY OF INVENTION

An object of the present invention is to provide a solar collector that is robust, provides good efficacy, and a good product life expectancy.

Another object of the present invention is to resolve at least some of the problems identified above while providing an environmentally friendly, cost effective, and practical solution replacing and complementing solar collectors that currently are on the market.

Thus, the invention generally relates to a solar collector adapted to absorb thermal heating from the sun. The solar collector comprises at least one hollow section adapted to house a medium and the solar collector is a self-supporting structure produced from a composite material constituted of at least a first and second material, wherein said first and second materials have equal or substantially equal coefficients of elasticity.

The composite solar collector is in a preferred embodiment a robust structure which in comparison to most other options on the market can withstand significant stress and forces without breaking. Composite materials are known to be used in for example building material and the strength of such materials is significantly stronger than other options that are currently available and used for solar collectors.

The at least one hollow section of the solar collector is a section within the solar collector that is hollow and adapted to house a medium. The medium can be any form of medium such as air, gas, or a liquid, preferably water. The at least one hollow section can be any form of section, including but not limiting, a hose, an extruded profile, or tubing. In a preferred embodiment is the at least one hollow section produced from extrusion and constitutes a part of the main body of the solar collector.

In prior art there has been significant problems with producing solar collectors of polymers or composite materials. Solar collectors made from polymers are thermally not as effective as glazed alternatives and the most common solution is to produce thin bag-like structures that absorb sunrays. Those structures are weak and have short life expectancy in direct sun light. Composite materials have better thermal properties and can thereby be made thicker, however attempts to for example include metal as part of the composite material in order to enhance the thermal properties has ended in solar collectors that cracks due to the degradation created by the sunlight.

When sunlight, and especially the UV-rays of the sunlight, hits a surface it affects the molecules in a way that the molecules shrink in length. This eventually causes the structure to break. Composite materials with good thermal properties have thereby not been considered beneficial for use in solar collectors. However, by utilizing a composite material with a first and second material that has a substantially equal or equal coefficient of elasticity those problems are avoided. This could in one embodiment be achieved by utilizing wooden materials and selecting polymers with a similar coefficient of elasticity for the composite material. In addition, the material is recyclable which adds to the environmentally friendly profile of such products.

Another advantage in relation to prior art solutions is that the solar collector through production of a composite material with substantially equal coefficients of elasticity can be made self-supporting meaning that the structure that is constituting the solar collector is a robust structure capable of withstanding load, carrying its own weight, and even be used as building material for building wharfs, piers, houses, roofs, etc.

In one embodiment of the composite solar collector are at least one hollow section a channel adapted for circulation of the medium, and said medium is water.

In another embodiment of the composite solar collector is the medium any mixture, containing water, for example a glycol and water mix, or any other anti-freeze medium, gas, or air.

In one preferred embodiment of the composite solar collector is the composite solar collector of a substantially elongated shape comprising a first and second absorption surface and two end pieces, wherein said first absorption surface is arranged substantially parallel to said second absorption surface.

It is further understood that the composite solar collector can have any form or shape suitable for its purpose. For example, if used as building material the solar collector could have the substantial shape of a batten or plank. In another embodiment the composite solar collector might be circular, rectangular, or any other suitable geometrical shape.

In one embodiment of the composite solar collector is the self-supporting feature utilized to create a dual-surface or two sided absorption solar collector meaning that the solar collector can absorb sunrays from two different directions. In one preferred embodiment of the invention the solar collector is thereby placed standing on its longitudinal edge in a north-south direction allowing for absorption of sunrays for most parts of the day. This can with the self-supporting solar collector be achieved without any additional supporting structure.

In the preferred embodiment wherein the solar collector is arranged on its longitudinal edge the solar collector have a reasonably equal absorption rate throughout the day. During the morning when the sun stands low in relation to the horizon the composite solar collector, has its first absorption surface directly perpendicular to the direction of the sunrays allowing a maximal absorption surface to be subjected to said sunrays. During the day the earth rotates in relation to the sun in a way that first absorption surface gradually is subjected to less sunrays. However, the sunrays also increase in intensity during this period making the absorption rate substantially equal. At noon, when the sunrays are the strongest, the sunrays falls in line with the longitudinal edge of the solar collector subjecting the solar collector to a minimum of absorption surface towards the sun. During the afternoon the sunrays instead hits the second absorption surface before disappearing at sunset.

In one embodiment of the composite solar collector is the first absorption surface arranged to absorb sunrays from a direction opposite to the second absorption surface.

The solar collector is in one embodiment shaped substantially as a cuboid or parallelepiped with two main absorption surfaces. The person skilled in the art understands that also other surfaces and edges of the solar collector indirectly work as absorption surfaces although their main purpose is the structural integrity of the solar collector and restricting the medium to the hollow sections of said solar collector.

In one embodiment of the composite solar collector are said first and second absorption surfaces adapted to absorb sunrays from different cardinal points.

In one embodiment of the composite solar collector is a reflector arranged substantially parallel to said first and second absorption surface.

Through arranging a reflector on one side of the solar collector both sides may be used for absorption simultaneously. The reflector is utilized to reflect sunrays towards the absorption surface that currently is in the shadow. The person skilled in the art understands that arranging multiple reflectors provides additional efficiency and that reflectors could be placed on both, or all, sides of the solar collector and thereby facilitating maximum absorption throughout the entire day.

Those skilled in the art further understands that reflectors may be arranged in relation to both said first and second absorption surfaces, as well as in any suitable additional angle thereto in order to increase the surface area subjected to sunrays at any or a given time.

Reflectors could in one embodiment be a mirror, in another any form of reflective material adapted to enable dual-side absorption. The dual-side absorption significantly increases the efficiency of the solar collector as well as enabling new application areas.

In one embodiment of the composite solar collector is the reflector adapted to reflect sunrays towards the absorption surface that currently is in the shadow.

The absorption surface that at any given point in time is in the shadow will be affected by the ambient temperature which normally is significantly lower than the temperature that can be achieved in direct sun light. This means that the shadow side of the solar collector will be decreasing the efficiency of the solar collector. This can be resolved by arranging one or more reflectors as previously described allowing for dual-side absorption.

In one embodiment of the composite solar collector is the composite solar collector produced with a material thickness of at least 4 mm, preferably to gain insulation from the material limiting the loss of heat into the ambient environment.

The material thickness of the prior art solutions are in general very thin making the structures weak and easy fragile. However, increasing the thickness is unbeneficial due to the thermal properties. The composite material as previously described comprises the advantage that the heat transfer rate can be maintained at a sufficient level.

Through utilizing an increased material thickness which is possible without losing efficiency with the composite material as previously described multiple benefits are achieved. For example, the increased material thickness provides additional insulation reducing the heat loss into the ambient environment. Furthermore, the material thickness decreases the risk for UV-degradation since depending on the geographical location and exposure to the sun polymer material degrades quickly. With the present solution as much as half a millimeter could be lost without affecting the overall performance of the solar collector significantly, although the insulation performance is decreased. This provides the advantage of polymer solar collectors without the disadvantages previously present in the state of the art solutions.

The person skilled in the art understands that the life expectancy of a solar collector as described herein would increase significantly over the prior art solutions. Enabling this without affecting the efficiency is enabling multiple new application areas and possibilities of increased efficiency.

In one embodiment the composite solar collector is a standalone complete system for heating of water.

In one embodiment is the composite solar collector a two sided solar collector that is a standalone complete system for heating of a medium.

Although the composite solar collector in one embodiment is adapted to be permanently arranged on for example a roof many of the components associated with prior art solutions may be removed. For example, in one embodiment is the composite solar collector a standalone complete system meaning that a sealed, with for example two caps, solar collector can be used independently of any other objects to heat for example water. This furthermore enables that the composite solar collector in one embodiment could be portable.

In one embodiment of the composite solar collector can the collector be used as a standalone system requiring no additional components, except for connection means sealing the medium inside of the collector or leading it to any form of application unit, such as a swimming pool. For example, if heated water is required a composite solar collector could be placed on a lawn, backyard, or any other suitable place in the sun, for an hour without any circulation. The solar collector thereby works as both a solar collector and water tank. Once the water has reached the desired temperature the collector could be picked up and carried for example inside.

In one embodiment could the standalone system be arranged fixed on for example a roof and attached to one or more hoses for water supply as well as emptying of heated water.

In one embodiment of the composite solar collector is the solar collector produced with an absorption surface reflecting a visible light wavelength interval between 400 nm and 700 nm.

In one embodiment of the composite solar collector is the solar collector is produced with absorption surface reflecting a visible light spectrum frequency interval between 430 THz and 750 THz, in some cases even 400 THz and 790 THz.

In one embodiment is the absorption surface adapted to reflect between 400 and 484 THz, (620-750 nm), in another 526-606 THz (495-570 nm) corresponding to red and green.

In one embodiment of the composite solar collector is the solar collector substantially red, orange, or green.

In one embodiment of the composite solar collector is the composite solar collector at least one of the following:
  produced with an absorption surface reflecting a visible light wavelength interval between 400 nm and 700 nm,
  produced with absorption surface reflecting a visible light spectrum frequency interval between 430 THz and 750 THz,
  produced so that said solar collector appears substantially red, orange, or green.

In one embodiment of the composite solar collector is the composite solar collector all of the following:
  produced with an absorption surface reflecting a visible light wavelength interval between 400 nm and 700 nm,
  produced with absorption surface reflecting a visible light spectrum frequency interval between 430 THz and 750 THz,
  produced so that said solar collector appears substantially red, orange, or green.

Solar collectors are traditionally made in dark colors, such as black or deep grey, due to that these colors have better absorption rates than lighter colors. However, an unexpected effect of the composite material as disclosed above is that the absorption rate is less affected by the color than for other solutions. This means that solar collectors could be produced in a wide range of colors without a significant loss of efficiency. This solves a problem for example in areas where the sun radiation is strong, such as Africa, where collectors with a little lower efficiency for example could provide water with more usable temperatures. Additionally, the market penetration for solar collectors is widely dependent on the possibility to receive building permits. Town architects are often negative to the esthetical element presented by solar collectors; this is resolved with a solution wherein the solar collector can be produced to resemble for example a metal or tile roof.

In one embodiment is the composite solar collector of a size that a user can carry around, preferably as a mobile solar collector.

In another embodiment is the composite solar collector arranged with wheels, in another is it arranged with any other device that facilitates mobility and thereby makes it easier to transport by a user between an absorption spot and where the heated medium is needed.

For some application areas it is beneficial that the solar collector is mobile or moveable. This could for example be for camping or for utilization in development countries.

In one embodiment of the composite solar collector are said different materials at least one polymer and one organic fiber material, preferably selected from a cellulous based material and a wooden material.

The wooden material can in one embodiment be scobs or sawdust. In another embodiment is the wooden material substantially formed as whirls or bogie springs, preferably as wooden parings, shavings, or curling chips.

In one preferred embodiment is the composite solar collector produced by extrusion or injection molding. However, the person skilled in the art understands that any suitable production method could be utilized.

In one embodiment is the composite solar collector adapted to house at least 40 liters of medium per square meter of absorption surface.

In a further embodiment is the composite solar collector adapted to house no more than 50 liters of medium per square meter of absorption surface.

The relation between the amount of medium within the solar collector and the absorption surface is important in order to get a good efficiency while avoiding overheating of the system. The amount of medium is further relevant in order to produce the desired temperatures of medium.

In one embodiment is the hollow section of said composite solar collector comprising irregularities, preferably bumps or craters, on the inner surface, preferably to enable whirling of the medium.

The irregularities are unexpectedly created when using the composite material due to moisture that is attracted by for example wood fibers. If solely polymers would be used both the inside and outside of the profile would be flat surfaces.

In one embodiment is the composite solar collector adapted to withstand a medium subjected to high pressure.

For some application areas it is beneficial to put a medium under high pressure into the solar collectors, this is something that couldn't be done with the majority of existing solutions on the market. Furthermore, there the self-supporting structure of the composite solar collector minimizes the expansion of the solar collector when a medium expands. This has the effect that when heating for example water a pressure is built within the solar collector that can be utilized upon usage of the medium inside.

In one embodiment is the composite solar collector adapted to be used as building material preferably as building material for a wharf, pier, wall, fence, roof, or any other form of construction.

The structural integrity of the material used for the solar collectors enables new application areas where for examples walls, fences, or roofs could be built from the solar collectors. Additionally, the esthetical appearance of such collectors would resolve many regulatory issues relating to building permits etc.

In one embodiment of the invention, the solar collector composite material consisting of two different materials, the first material being a polymer and the second material being wood fiber parings, wood fiber curling chips, wood fiber shavings, or similar wood fibers that has a whirl or bogie spring shape.

In one embodiment of the composite solar collector does one of the different materials in said composite solar collector have a whirl or bogie spring shape.

Those skilled in the art understands that preferably are the wooden material formed as a whirl or bogie spring, however other materials are suitable for composite materials as well and can be used for the solar collector within the scope of the invention.

In one embodiment does the hollow section of said composite solar collector comprise irregularities on an inner surface arranged in contact with said medium, preferably bumps or craters to enable whirling of the medium.

The solar collectors are in one preferred embodiment produced through extrusion which with beneficially can be used to create said bumps and/or craters that helps the medium within the solar collector to be evenly distributed and heated.

According to an aspect, a solar collector arrangement comprises at least one solar collector, wherein said solar collector is a composite solar collector.

In one embodiment is said composite solar collector a solar collector according to any of the herein described embodiments. The solar collector arrangement is an arrangement wherein the composite solar collector as disclosed herein is arranged during operation.

According to one embodiment of the composite solar collector is the composite solar collector of a substantially elongated shape and comprises a first and second absorption surface. The absorption surfaces are arranged on the outside of said composite solar collector and said first absorption surface is arranged substantially parallel to said second absorption surface. The composite solar collector is a two sided solar collector meaning that the composite solar collector can absorb sunrays from at least two directions on two different surfaces.

The composite solar collector further comprises two end pieces as well as two elongated side pieces connecting said first and second absorption surfaces together creating a composite solar collector preferably in the shape of a rectangle or cuboid. Those skilled in the art understands that the composite solar collector as described herein have multiple surfaces and that all surfaces indirectly has the ability to absorb sunrays, however said two absorption surfaces are adapted for sun absorption and substantially the largest surfaces of the composite solar collector.

In one embodiment of the composite solar collector is said first absorption surface arranged to absorb sunrays from a direction opposite to the second absorption surface, preferably from a direction of a different cardinal point.

In one embodiment the solar collector arrangement further comprises at least one reflector that is arranged substantially parallel to said first and second absorption surface, preferably wherein said reflector is adapted to reflect sunrays towards the absorption surface that currently is in the shadow.

In another embodiment, the solar collector arrangement further comprises at least one solar cell, wherein the solar collector has at least one absorption surface adapted to absorb sunrays, and the at least one solar cell is arranged on the at least one absorption surface.

Another beneficial and unexpected effect of the composite solar collector is that due to its self-supporting feature it is possible to arrange other items on the solar collector absorption surfaces, and other surfaces of the composite solar collector. Another advantage is that the composite solar collector is affected not only of direct sunrays but also of ambient temperature meaning that the solar collector works well if the ambient temperature is high enough even if no direct sunrays currently are present on the absorption surfaces. Thereby can the composite solar collector as described herein in another embodiment be used as a combined cooling device and solar collector for solar cells. As appreciated by the person skilled in the art, solar cells are adapted to harvest electrical energy from the sun while solar collectors are adapted to harvest thermal energy. This embodiment is further described in the detailed description below.

In one embodiment does the solar collector arrangement comprise at least one composite solar collector and more than one reflector arranged moveably, wherein said reflectors are adapted to be controlled to reflect sunrays towards at least one of a first and second absorption surface.

In one embodiment of the solar collector arrangement is the more than one reflector arranged to follow the suns cardinal point during the day.

In one embodiment of the solar collector arrangement is the more than one reflector arranged to be individually moved into reflecting sunrays towards at least one of said first and second absorption surfaces.

It is an advantaged with the composite solar collector arrangement that through moving one or more reflectors can the surface temperature of an absorption surface be controlled.

It is understood that any of the aforementioned embodiments could be combined in any suitable way within the scope of the invention as long as such combination is not contradictory to the overall functionality of the composite solar collector.

BRIEF DESCRIPTION OF DRAWINGS

The invention is now described, by way of example, with reference to the accompanying drawings, in which.

DESCRIPTION OF EMBODIMENTS

In the following, a detailed description of composite solar collector is provided in light of the appended drawings.

Figure 1:
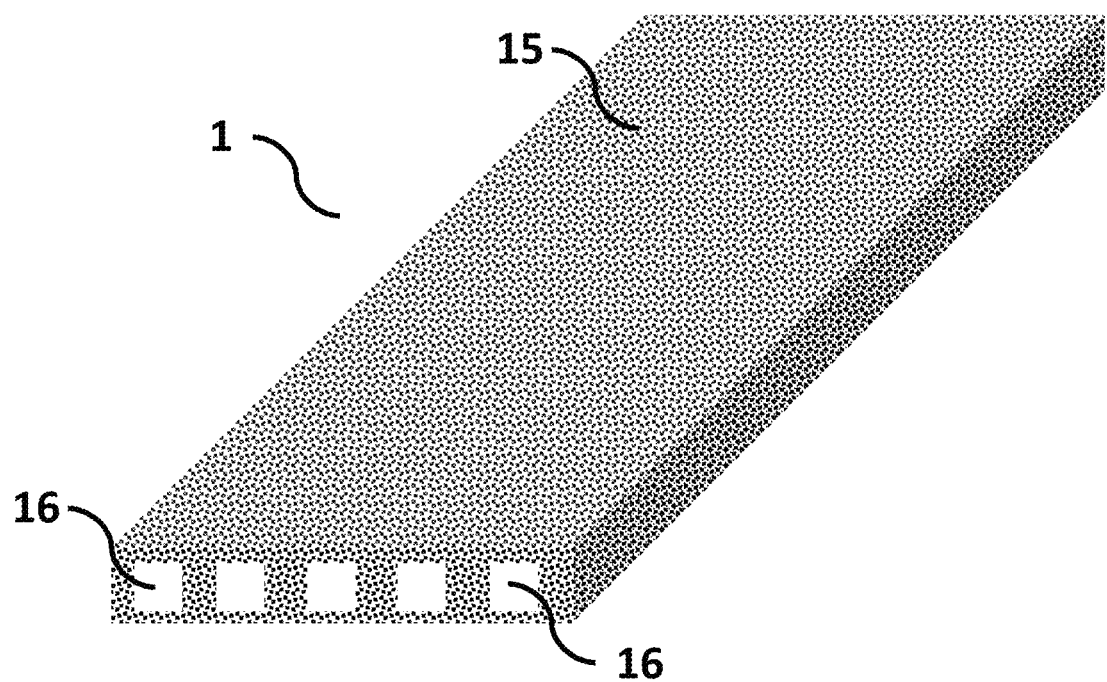
FIG. 1 illustrates a principal sketch of one embodiment of the composite solar collector, wherein the composite material is illustrated.

FIG. 1 illustrates a principal sketch of the solar collector 1 wherein the composite material 15 is illustrated. As shown the composite material is a mixture of at least two components, or as previously mentioned materials that constitutes the production material for the solar collector. In a preferred embodiment these materials are at least one polymer with equal coefficient of elasticity with wooden scobs. However, the person skilled in the art understands that any materials with equal or substantially equal coefficient of elasticity could be used by the person skilled in the art producing the solar collector as herein disclosed. FIG. 1 further illustrates the hollow sections 16, or channels 16, that the medium is stored, circulated, or transported within.

FIG. 1 further illustrates an example of how the collector body in one embodiment could look during production, for example the collector body could be extruded in long continuous sections.

Figure 2:
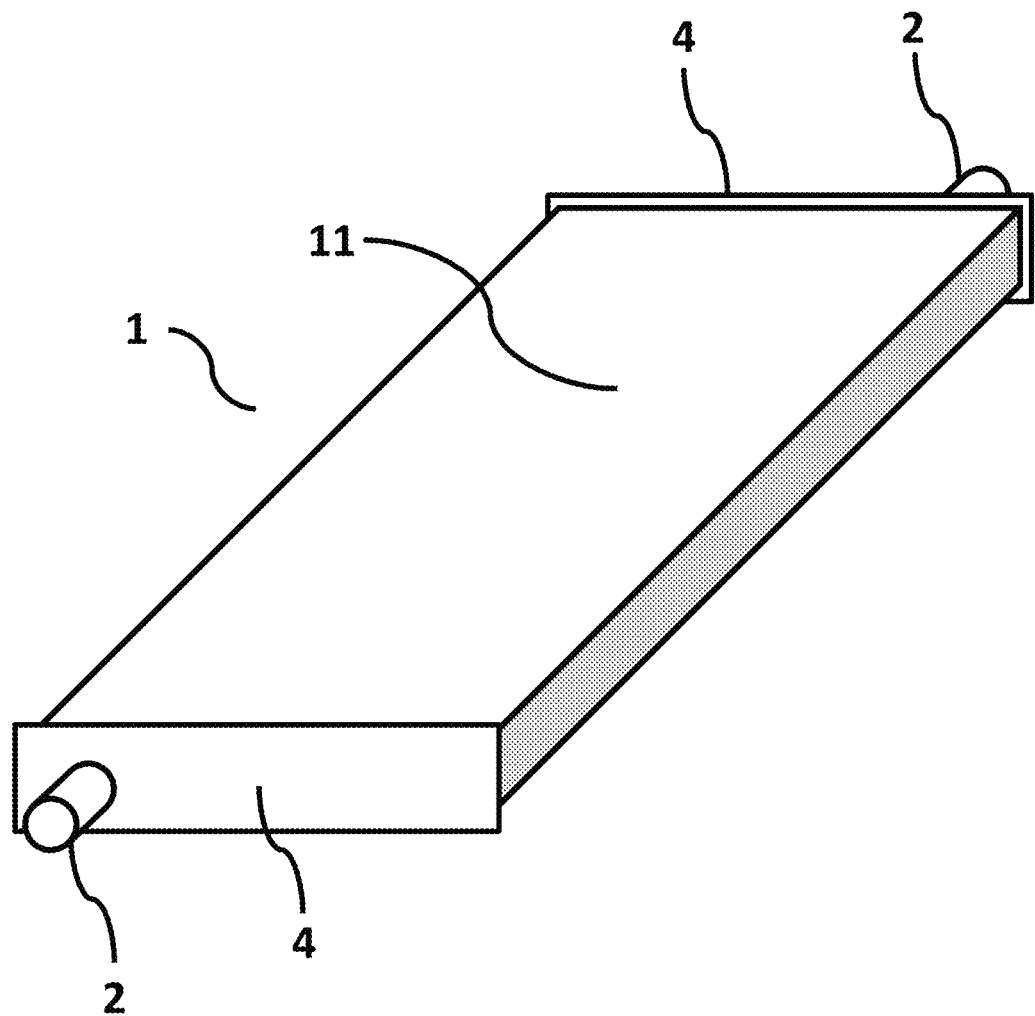
FIG. 2 illustrates an embodiment of the composite solar collector.

FIG. 2 illustrates the composite solar collector in a preferred embodiment wherein the solar collector 1 comprises a first absorption surface 11, an inlet and outlet 2, as well as two end pieces 4. The person skilled in the art understands that the solar collector 1 further comprises the second end piece 4, as well as a second absorption surface hided or partly hidden from view in FIG. 2. FIG. 2 further illustrates the elongated shape of the solar collector 1 which is a preferred embodiment. However, those skilled in the art understand that the solar collector 1 can have different shapes or forms within the scope of the claimed invention.

Figure 3:
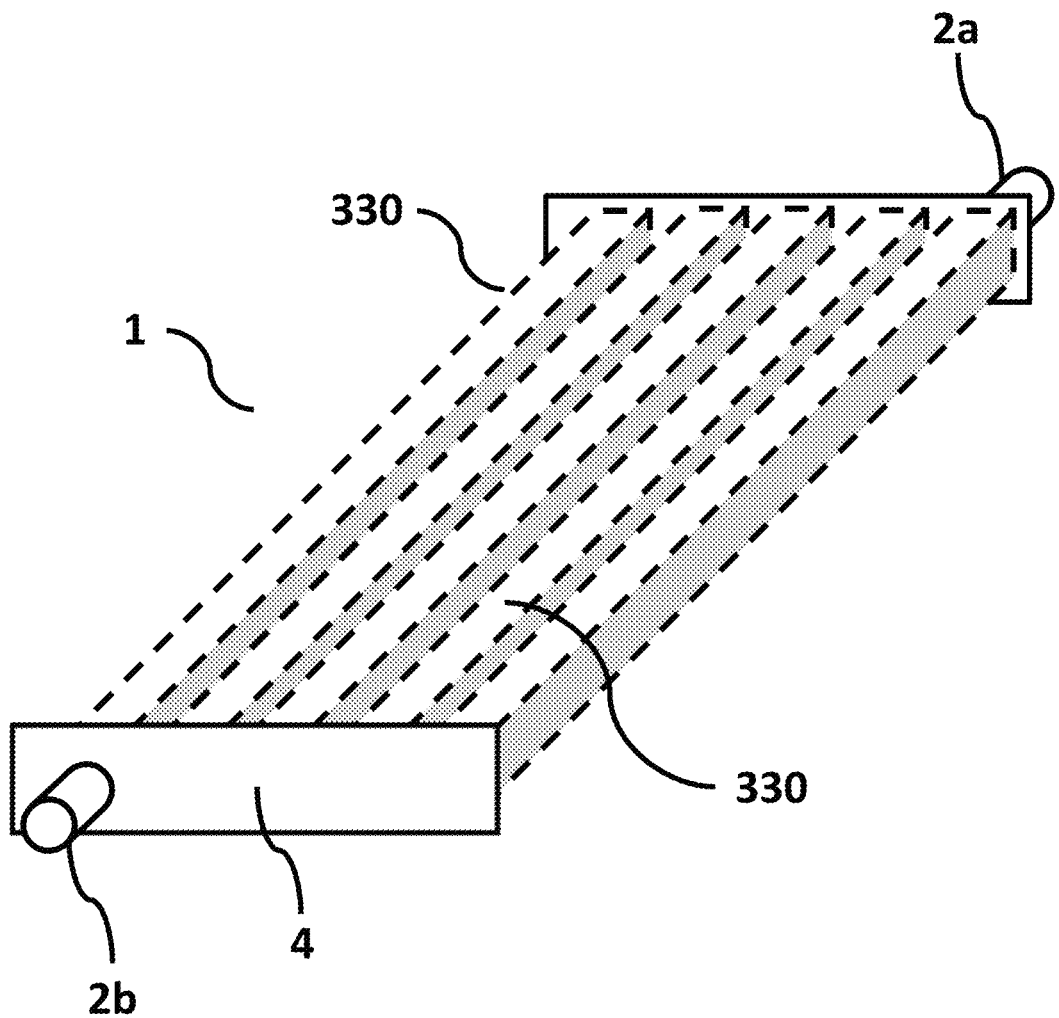
FIG. 3 illustrates a view of an embodiment of the composite solar collector wherein the absorption surfaces have been removed showing the hollow sections.

FIG. 3 illustrates an embodiment of the solar collector wherein the absorption surfaces are transparent or removed in a way that the hollow sections 330 inside are shown. The embodiment as illustrated in FIG. 3 is in general an example embodiment only for illustration purposes, however, in one embodiment could the solar collector be produced with multiple absorption surfaces arranged on each hollow section 330 as illustrated in FIG. 3.

Figure 4:
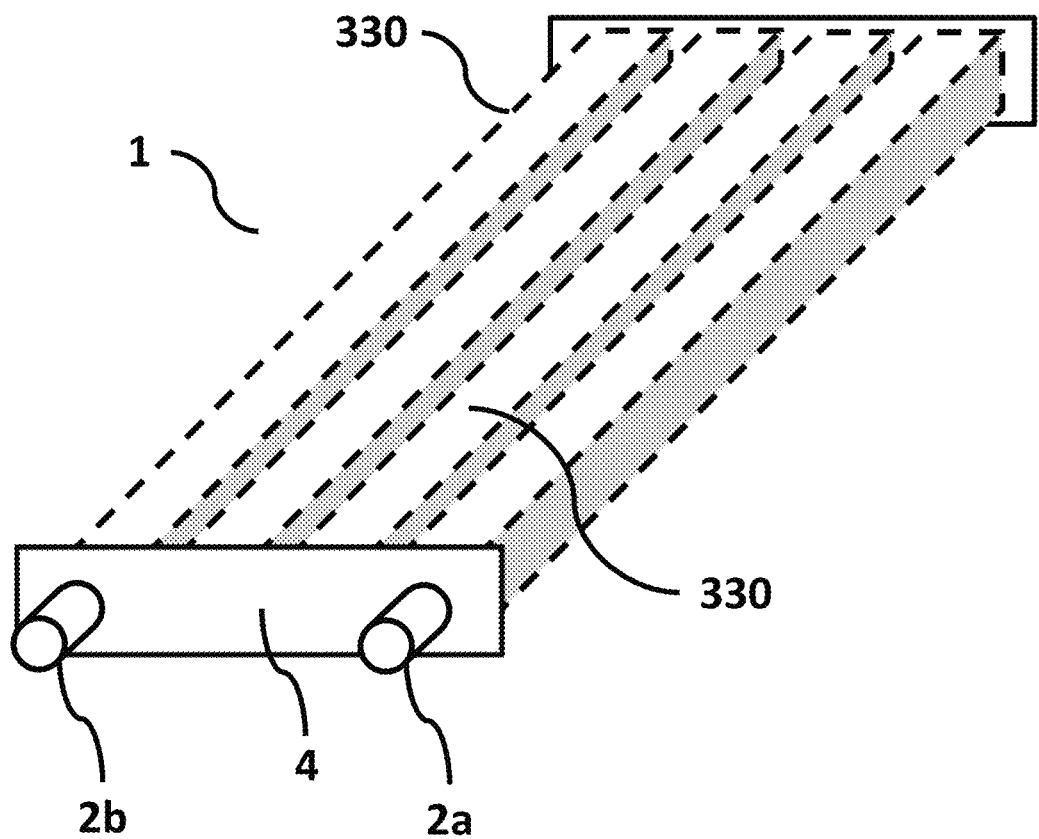
FIG. 4 illustrates another embodiment of the composite solar collector wherein the absorption surfaces have been removed showing the hollow sections.

FIG. 4 illustrates another embodiment similar to the embodiment as illustrated in FIG. 3 however, with the input 2a and output 2b arranged on the same end piece 4. Those skilled in the art understands that the number of hollow sections 330 as illustrated in FIG. 3 and FIG. 4 can be any number of hollow sections 330 depending on the size and preferred application area for each solar collector. The composite solar collector as described herein is not limited to any specific number of hollow sections 330. In another embodiment could the composite solar collector 1 have only one hollow section 330.

Figure 5:
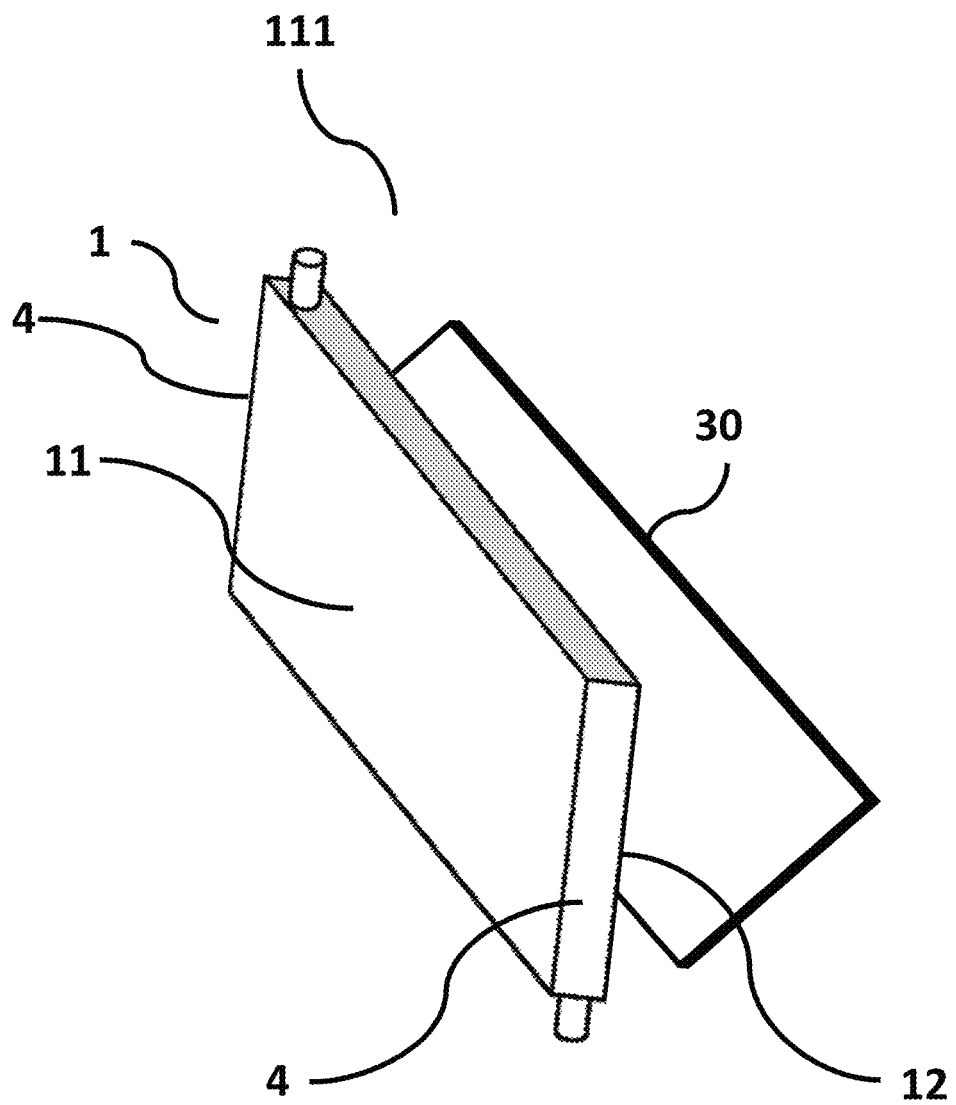
FIG. 5 illustrates an embodiment of the composite solar collector arrangement wherein a solar collector and a reflector has been arranged to improve dual surface absorption.

FIG. 5 illustrates one embodiment of the solar collector 1 wherein a reflector 30 has been arranged on one side of the solar collector 1. The reflector 30 can be any form of reflector, by way of example but not limited to, a mirror, a reflective object, a sheet of glass, or any other suitable reflective arrangement. The reflector 30 is arranged to reflect sunrays towards the second absorption surface while the direct sunrays hits the first absorption surface 1.

Figure 6:
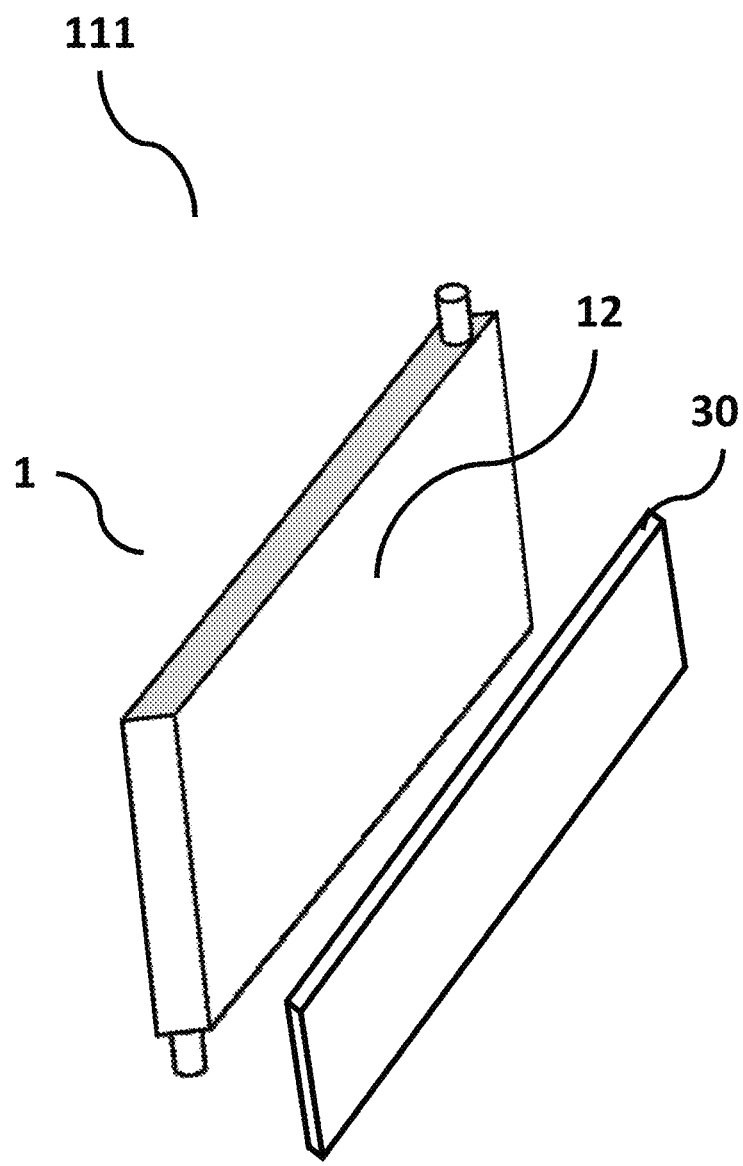
FIG. 6 illustrates an embodiment of the composite solar collector arrangement wherein the second absorption surface of a solar collector is visible.

FIG. 6 illustrates a second view of the embodiment as illustrated in FIG. 3 wherein the reflector 30 is arranged to reflect sunrays towards the second absorption surface 12 of the solar collector 1.

In addition to using the same coefficient of elasticity the composite material can be made stronger through utilization of parings, curling chips, shavings, or similar that has a whirl or bogie spring shape creating extra flexibility in the fibers. This further reduces the risk for crack building in the solar collector.

Figure 7:
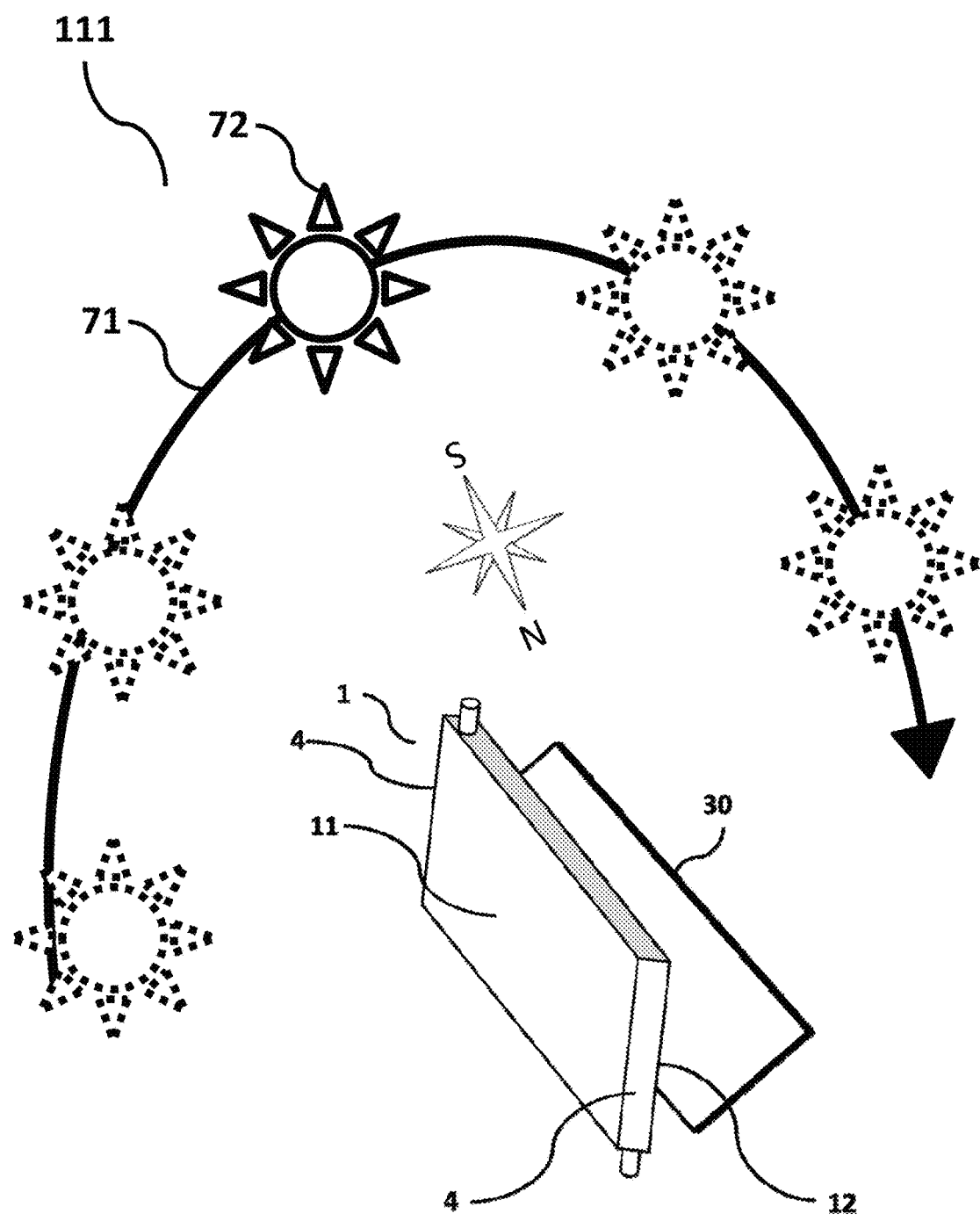
FIG. 7 illustrates an embodiment of the composite solar collector within a composite solar collector arrangement.

FIG. 7 illustrates one embodiment of the composite solar collector 1 in a composite solar collector arrangement 111 wherein a reflector 30, such as a mirror or any other reflective object, is arranged on one side of said solar collector and adapted to reflect sunrays towards an absorption surface 11, 12, especially an absorption surface 12 (see FIG. 6) that for the time being is located in the shadow. The person skilled in the art understands that the absorption surface 11, 12 that is located in the shadow may be different absorption surfaces 11, 12 during different times of the day which is further illustrated in FIG. 7. The path of the sun 71 shows different positions of the sun 72 during different times of the day and further illustrates what cardinal points the composite solar collector 1 in one embodiment is located in.

The person skilled in the art understands that in one preferred embodiment as illustrated in FIG. 7 is the solar collector 1 of the solar collector arrangement arranged in a north-south direction creating the most equal power outtake during the day. Those skilled in the art further understands that a second reflective object 30 preferably may be arranged on the opposite side of the solar collector 1 in relation to the first reflector 30 as illustrated in FIG. 7 in order to reflect sunrays in the afternoon.

When the sun rises the sunrays are not as intense as they are during the middle of the day and thereby the direction of the solar collector as illustrated in FIG. 7 provides benefits unheard of for regular solar collectors. The solar collector has an absorption surface 11 directed towards the sunrays during the morning, simultaneously are also sunrays reflected in the reflector 30 in a way that the second absorption surface 12 also is heated. At noon when the sun is the most intense only an end piece 4 is in a perpendicular direction to the sunrays while the first 11 and second 12 absorption surface are arranged in a longitudinal direction creating less absorption surface area directed towards the sun. However, due to the increased intensity of the sun during the middle of the day it is still in one embodiment possible to have a similar efficiency during those hours. Those skilled in the art understands that the end piece 4 thereby can work as an indirect absorption surface as well as the longitudinal side connecting said first 11 and second 12 absorption surfaces.

Figure 8:
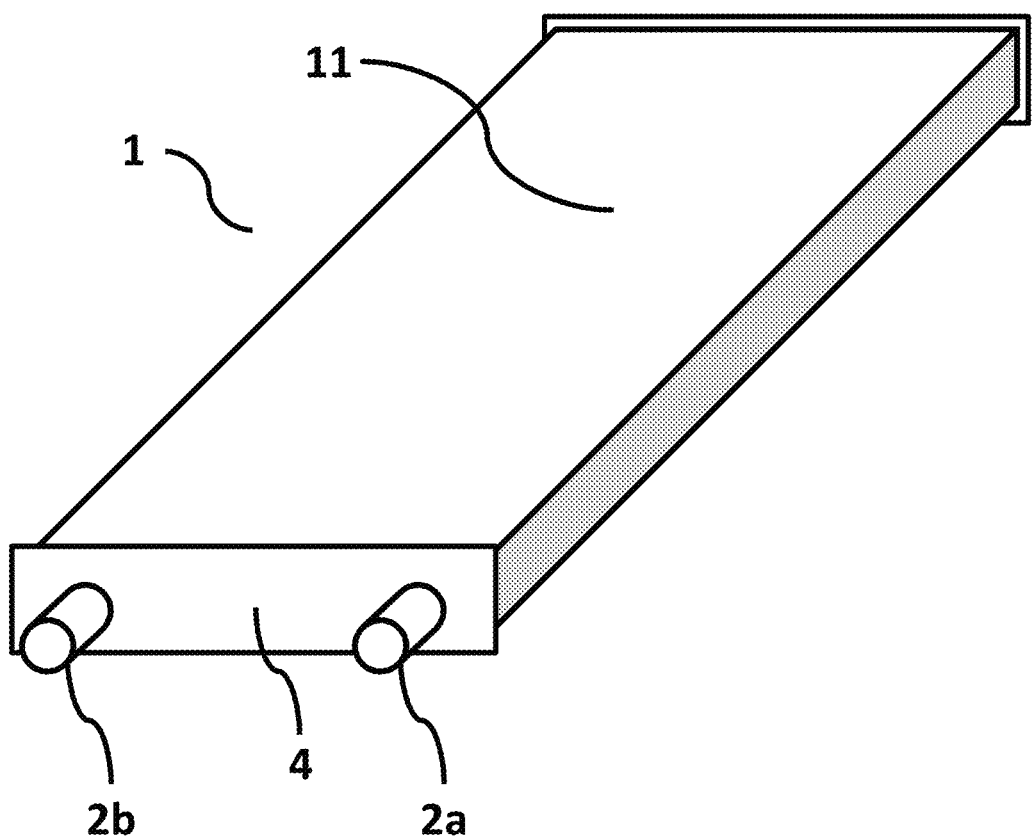
FIG. 8 illustrates a second embodiment of the composite solar collector wherein an inlet and outlet is arranged on the same end piece.

FIG. 8 illustrates an embodiment corresponding to the embodiment as illustrated in FIG. 4 wherein the input 2a and output 2b are arranged on the same end piece 4. The input 2a and output 2b are in one embodiment interchangeable and the medium can be circulated in any preferred direction. In one embodiment could the circulation be conducted in both directions depending on which side the heated medium was extracted last time.

Figure 9:
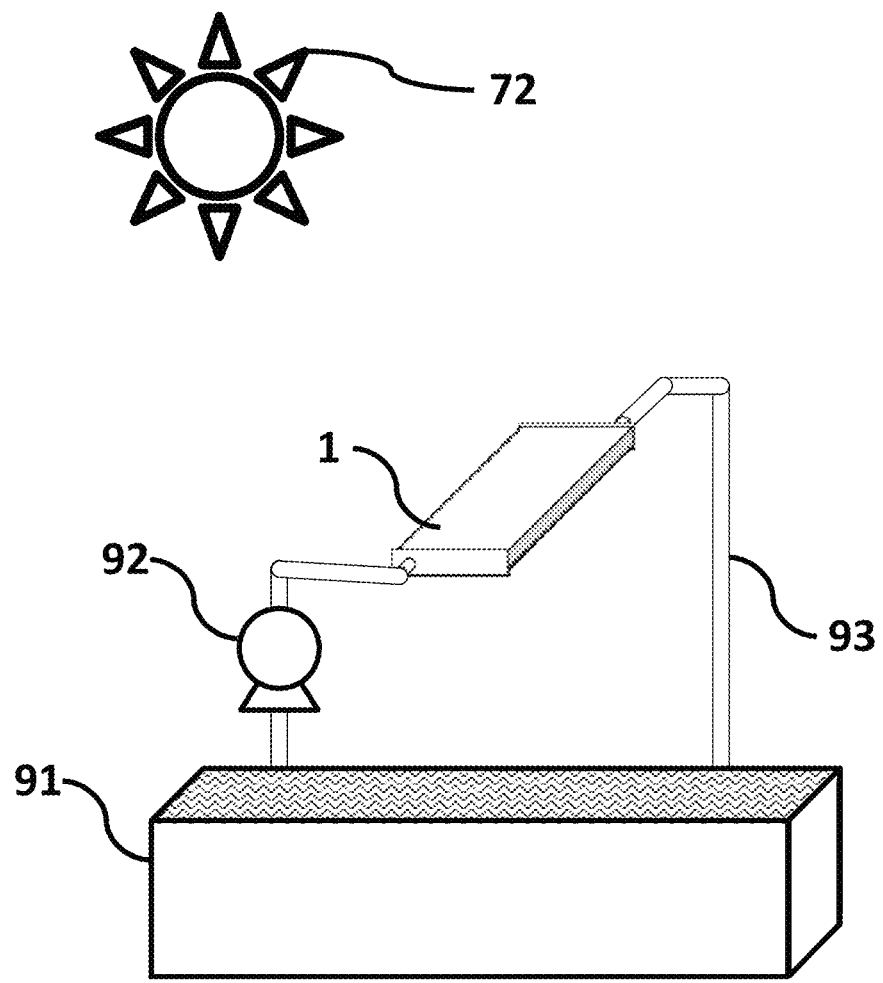
FIG. 9 illustrates an embodiment of the composite solar collector within a solar collector arrangement wherein the solar collector is arranged within a system of a typical example application area.

FIG. 9 illustrates an embodiment of the solar collector 1 wherein the solar collector is arranged in a typical application area heating the water of a swimming pool 91. The water is in one embodiment as illustrated in FIG. 9 circulated by a circulation pump 92 between said solar collector 1 and the swimming pool 91 through connection means 93, such as pipes, tubes, or hoses. In another embodiment circulation occurs naturally due to the heat changes within the system comprising the solar collector 1 and the swimming pool 91. The swimming pool 91 is an illustration example and any form of water tank, shower, or other application can be used within the embodiment as illustrated by FIG. 9.

Figure 10:
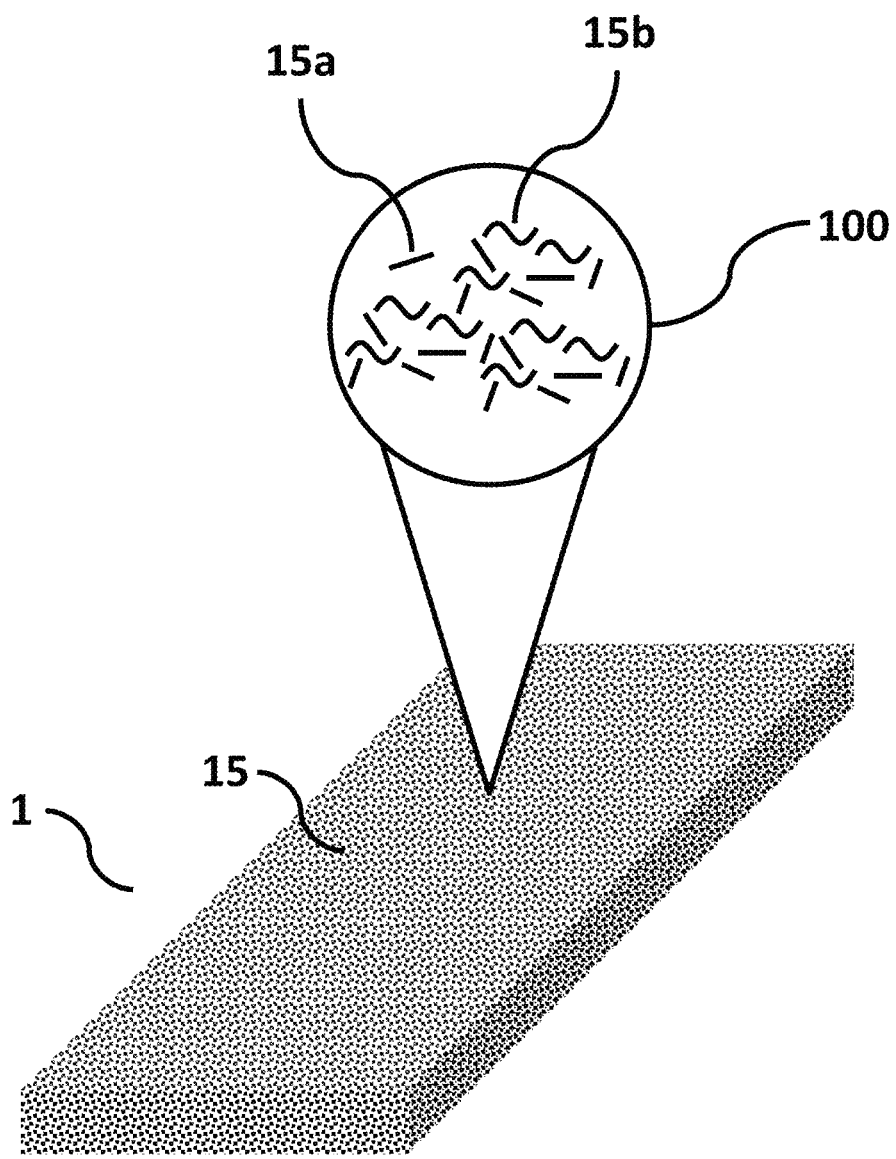
FIG. 10 illustrates an embodiment of the composite material consisting of at least two materials, wherein one of the materials has a material structure shape of a whirl or bogie spring shape.

FIG. 10 illustrates one embodiment of the composite material 15 of the solar collector 1 wherein an illustrative magnification 100 illustrates the composite material 15 in further detail. The embodiment as illustrated in FIG. 10 is a preferred embodiment of the composite material 15 wherein two different materials 15a, 15b, are used. The first material 15a being a polymer and the second material 15b being wood fiber parings, wood fiber curling chips, wood fiber shavings, or similar wood fibers that has a whirl or bogie spring shape. The wood fiber that has a whirl or bogie spring shape creates elasticity in the material which is a significant improvement over solutions where straight wood fibers are used. The usage of whirl or bogie spring shaped fibers are not a limiting embodiment for the solar collector however a significant improvement and a preferred embodiment. For embodiments where straight fibers, such as sawdust or scobs, are used for composite materials the composite material becomes robust but fragile and with a low amount of elasticity. This creates problems when loads are applied to the solar collector and the risk for cracks in the material increases.

According to one embodiment of the composite solar collector and composite solar collector arrangement can any form of wooden material be used as the second material 15b without limitations to certain wood types. The key is that wooden fibers differ from other fibers, such as carbon fiber or glass fiber by means of their fundamental design. Natural fibers are adapted to transport water in for example a tree and have thereby developed a structure that consists of fibers that are curved, twisted, or whirl formed. However, other fibers, such as glass fiber and carbon fiber, are straight and thereby less flexible. The first material 15a could be any form of polymer, preferably polyethylene or polypropylene depending on the geographical place wherein the solar collector is applied. Polyethylene handles degrees below zero better than polypropylene and is thereby better suited for some geographical regions. In another embodiment can hemp from old bags or similar be used as the second material 15. This creates additional dimensions to the sustainability of the solar collectors. The solar collectors are in addition to being fully recyclable possible to produce from material recycled from other products.

Figure 11:
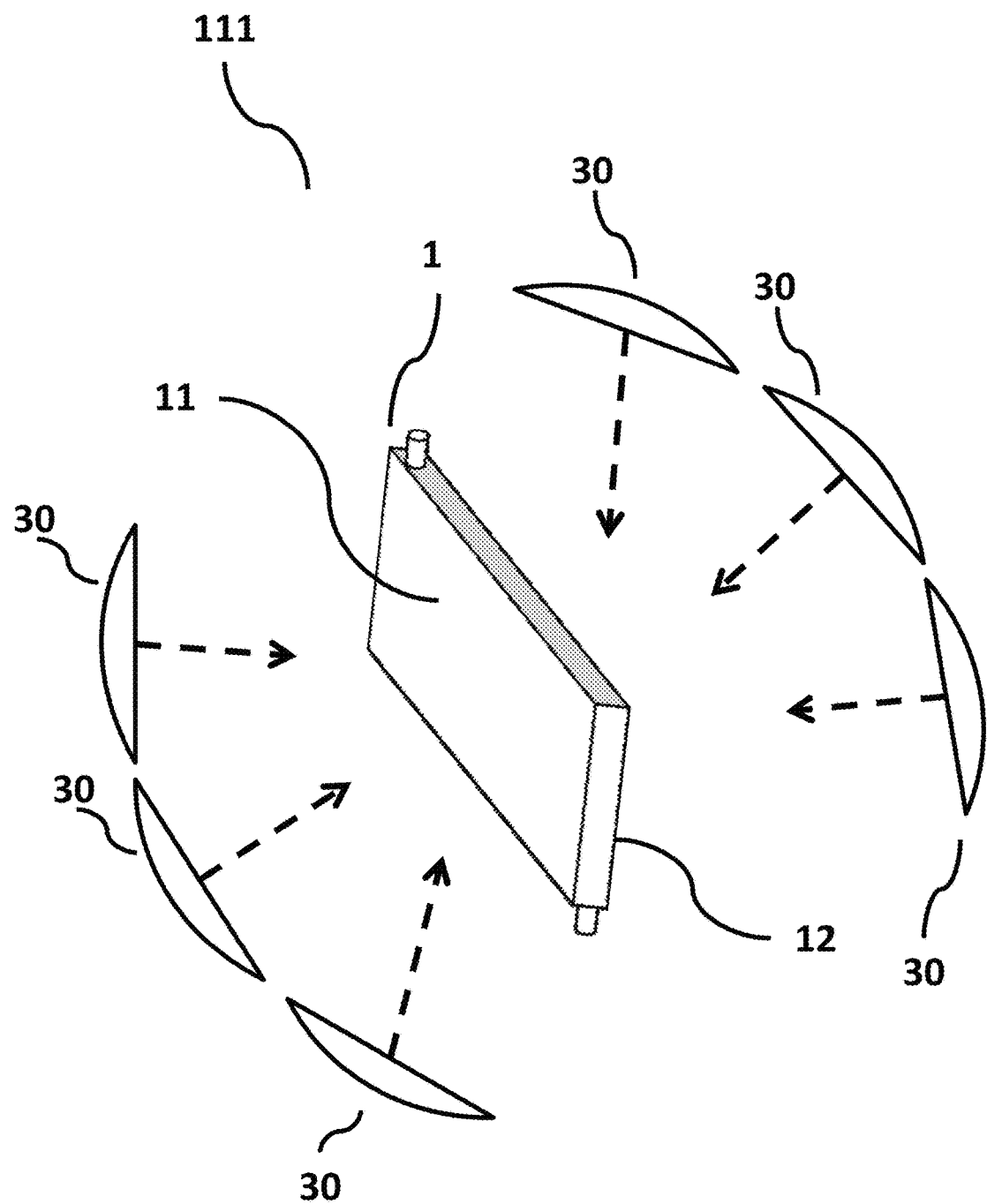
FIG. 11 illustrates an embodiment wherein multiple movable reflectors are arranged in a solar collector arrangement and directed towards a composite solar collector.

FIG. 11 illustrates an embodiment of the solar collector arrangement 111 wherein multiple reflectors 30 are arranged around a solar collector 1. The multiple reflectors 30 are arranged to reflect sunrays towards the first 11 and second 12 surface of the solar collector 1. The reflectors may be of any form or shape and can for example be flat mirrors or parabolic reflectors, however those skilled in the art understands that many differ forms, types, and shapes of reflector might be used.

Figure 12:
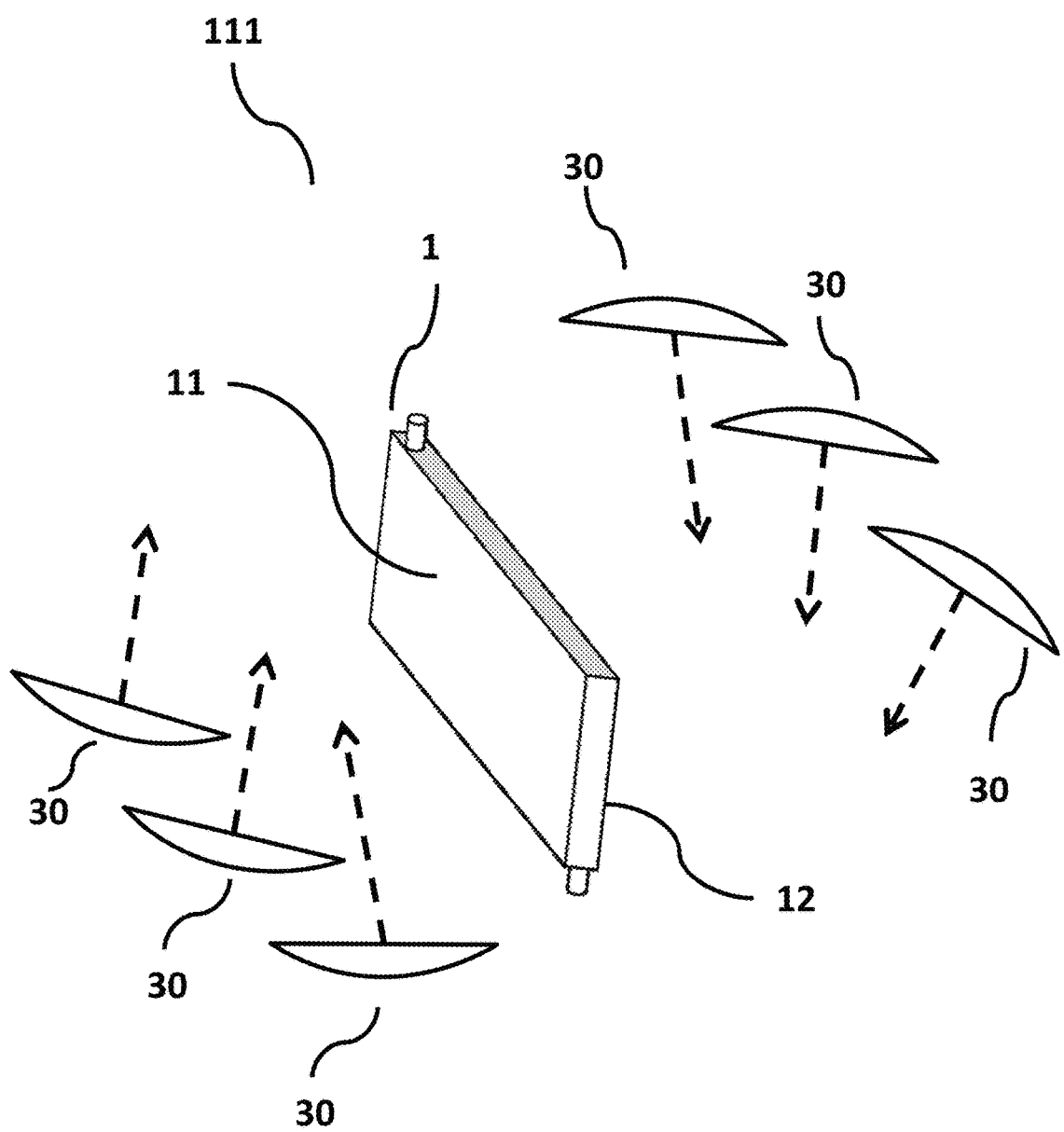
FIG. 12 illustrates another embodiment wherein multiple movable reflectors are arranged in a solar collector arrangement and directed away from a composite solar collector.

FIG. 12 illustrates another embodiment of the solar collector arrangement 111 wherein the reflectors 30 as illustrated in FIG. 11 are movably arranged in a way that sunrays may be directed either towards said first 11 and second 12 absorption surfaces (as illustrated in FIG. 11) or a way from the first 11 and second 12 absorption surfaces (as illustrated in FIG. 12). Depending on the intensity of the sun one or more reflector 30 can be directed towards or away from the first 11 and/or the second 12 absorption surface creating an arrangement 111 wherein the surface temperatures can be controlled.

Figure 13:
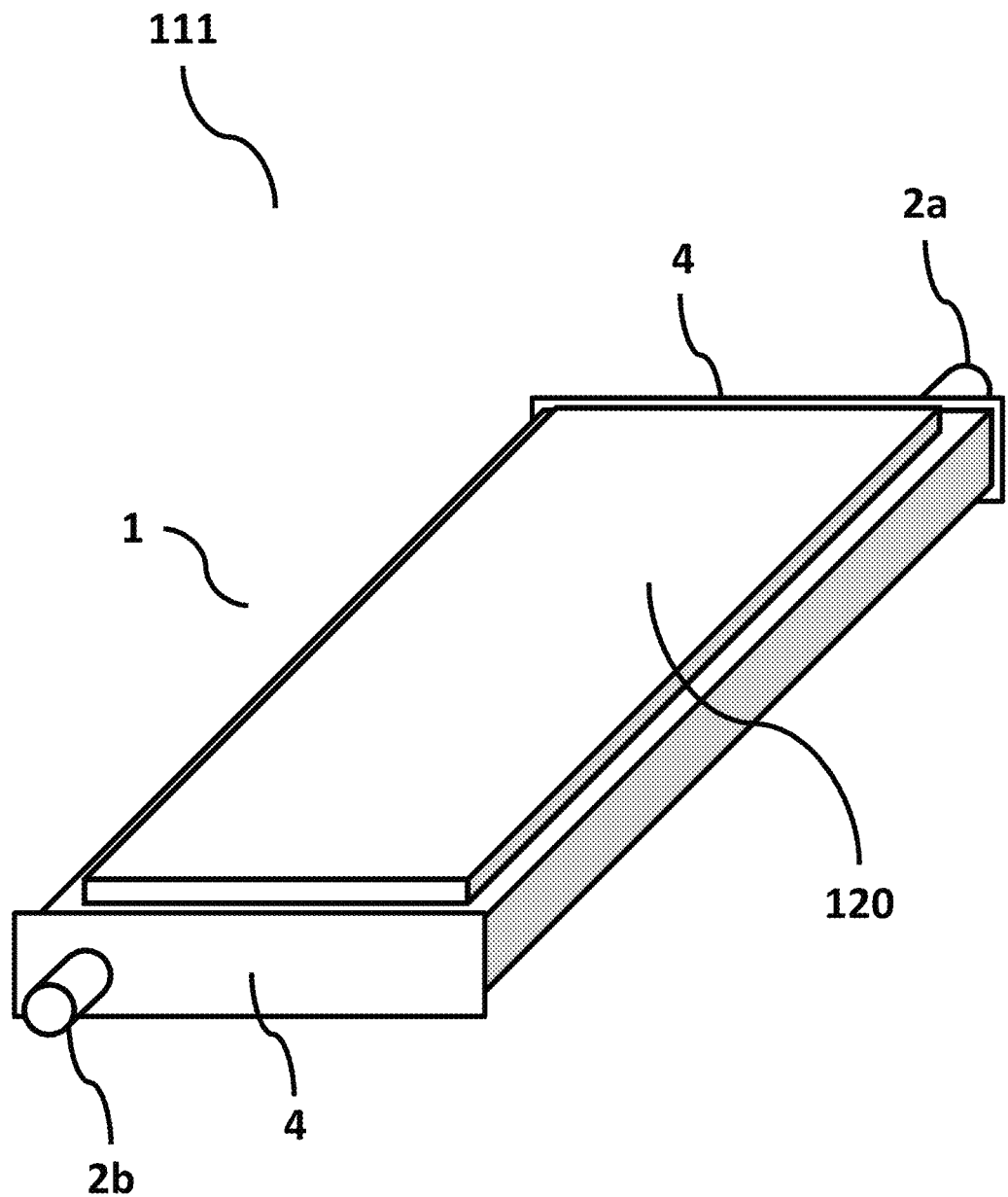
FIG. 13 illustrates an embodiment of a solar collector arrangement wherein at least one solar cell is arranged on a composite solar collector.

FIG. 13 illustrates an embodiment of the solar collector arrangement 111 wherein solar cells 120 are arranged on one or more absorption surfaces of the solar collector 1.

The solar collector 1 is adapted to absorb thermal energy from the sun and transfer that heat to a medium inside the solar collector 1, such as water. The heat is in general absorbed from sunrays subjected to the absorption surfaces 11, 12 of the solar collector 1. However, the medium within the solar collector 1 can be heated even without direct sunrays if the ambient temperature is warmer than the medium within the solar collector 1. This together with the heat transfer rate enables that the composite solar collector 1 in a further embodiment may be used to cool other devices. In a preferred embodiment wherein the composite solar collector 1 is used as a cooling element are solar cells arranged on one or more of the absorption surfaces 12, 13. The solar cells produce electricity and are in general designed to absorb as much of the energy from the sun as possible. This creates a problem due to the vast amount of excessive heat that is absorbed around solar cells generating electricity, furthermore this excessive heat even decreases the efficiency rate of the solar cells. By arranging solar cells on the self-supporting composite solar collectors 1 are thereby an arrangement 111 created wherein both warm water and electricity is created from an arrangement with better efficiency than prior art solutions. It is without problem possible to reach heats of 50 degrees Celsius for the warm water produced in such an arrangement 111.

In one embodiment of the solar collector arrangement 111 comprising at least one composite solar collector 1 with solar cells 120 arranged on an absorption surface 11, 12 around 17% of the energy that is exerted upon the solar cells are converted to electric energy, the remaining portion is excessive heat energy which can be used for production of warm water through the composite solar collector 1. This can't be done with for example flat plate solar collectors or evacuated tube solar collectors since they require direct sun light in order to achieve a good efficiency.

The invention claimed is:

1. A solar collector adapted to absorb thermal heating from a sun, wherein said solar collector comprises at least one hollow section adapted to house a medium, wherein the solar collector is a self-supporting structure produced from a composite material being a single material made from a mixture of at least a first and second material, wherein said first and second materials are different materials with equal or substantially equal coefficients of elasticity, wherein said first material is a polymer and said second material is an organic fiber material comprising cellulous based material or wood, and wherein the hollow section comprises irregularities on an inner surface arranged in contact with said medium, preferably bumps or craters to enable whirling of the medium.

2. The composite solar collector according to claim 1, wherein the at least one hollow section is at least one channel adapted for circulation of the medium, and said medium is water.

3. The composite solar collector according to claim 1, wherein said composite solar collector is produced with a material thickness of at least 4 mm, preferably limiting the loss of heat into an ambient environment.

4. The composite solar collector according to claim 1, wherein said composite solar collector is a two sided solar collector.

5. The composite solar collector according to claim 1, wherein said composite solar collector is a complete stand-alone mobile solar collector system for heating of the medium.

6. The composite solar collector according to claim 1, wherein said composite solar collector is adapted to be used as building material, preferably as building material for a wharf, pier, wall, fence, roof, or any other form of construction.

7. The composite solar collector according to claim 1, wherein one of the first and second materials in said composite solar collector has a whirl or bogie spring shape.

8. The composite solar collector according to claim 1, wherein said composite solar collector comprises at least one of the following:
   an absorption surface reflecting a visible light wavelength interval between 400 nm and 700 nm,
   an absorption surface reflecting a visible light spectrum frequency interval between 430 THz and 750 THz,
   an absorption surface that appears substantially red, orange, or green.

9. A composite solar collector arrangement comprising a solar collector according to claim 1, wherein the solar collector arrangement is of a substantially elongated shape, comprising a first and second absorption surface on an outside of said composite solar collector, said first absorption surface is substantially parallel to said second absorption surface and the composite solar collector is a two sided solar collector.

10. The composite solar collector arrangement according to claim 9, wherein said first absorption surface is arranged to absorb sunrays from a direction opposite to the second absorption surface, preferably from a direction of a different cardinal point.

11. The composite solar collector arrangement according to claim 9, wherein the solar collector arrangement further comprises at least one reflector that is arranged substantially parallel to said first and second absorption surface, preferably wherein said reflector is adapted to reflect sunrays towards the absorption surface that currently is in the shadow.

12. The composite solar collector arrangement according to claim 10, wherein the solar collector arrangement further comprises at least one reflector that is arranged substantially parallel to said first and second absorption surface, preferably wherein said reflector is adapted to reflect sunrays towards the absorption surface that currently is in the shadow.

13. The composite solar collector arrangement according to claim 9, wherein the solar collector arrangement further comprises a solar cell arranged on one of the absorption surfaces.

14. The composite solar collector arrangement according to claim 10, wherein the solar collector arrangement further comprises a solar cell arranged on one of the absorption surfaces.

* * * * *